Nov. 3, 1931.  H. G. ALLEN  1,830,080
FISH LURE
Filed March 4, 1930
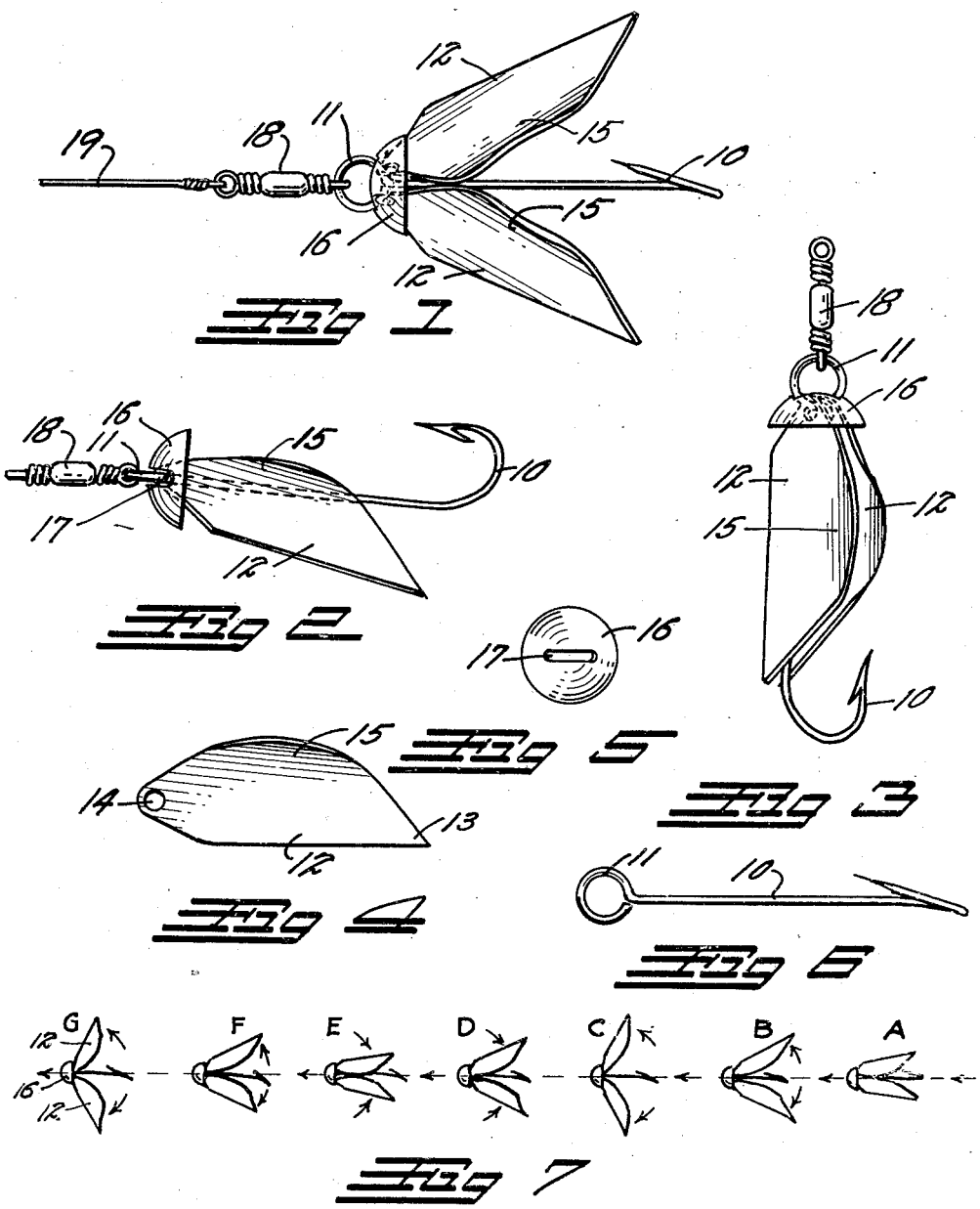
Inventor
HAROLD G. ALLEN
By
Attorney Patented Nov. 3, 1931

1,830,080

UNITED STATES PATENT OFFICE

HAROLD G. ALLEN, OF DENVER, COLORADO

FISH LURE

Application filed March 4, 1930. Serial No. 433,006.

This invention relates to a fish lure and has for its principal object the provision of a winged lure which, when drawn through the water will flap or oscillate its wings to simulate the struggles of an insect or small bird in water.

Another object of the invention is to construct a lure entirely of metal, the wings of which will flutter so as to create a metallic clicking noise to call the attention of the fish to the lure.

Other objects are to provide a lure, which will cast well because of the weight and shape of the metallic wings; which will retrieve easily with a live natural action; which will always travel with the hook barb upward to both facilitate hooking the fish and guarding the hook from weeds; and which will be economical to manufacture, convenient to pack and practically indestructible.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:—

Fig. 1 is a top view of the lure as it would appear in the water while being trolled or retrieved.

Fig. 2 is a side view of Fig. 1.

Fig. 3 illustrates the appearance of the lure when out of the water.

Figs. 4, 5, and 6 illustrate various parts of the lure.

Fig. 7 is a diagrammatic view illustrating the action of the lure when drawn through the water.

The improved lure comprises a hook 10 which is preferably provided with a relatively large eye 11. The hook 10 may be a standard eyed hook with a separate, loose ring in place of the large eye 11. Two metallic wings 12 are loosely hung upon the eye 11, as illustrated. The wings 12 are preferably formed with curvated upper edges and straight lower edges. The wings terminate in a substantial point 13 at one extremity. The other extremity is provided with an eye opening 14. The hook eye 11 passes through the eye opening 14. The upper curved side of the wings 12 is turned outwardly to form a slight concavity 15 along the upper wing edge.

After the wings 12 are in place upon the ring or eye 11 a metallic cap 16 is slipped over the eye, there being an elongated opening 17 in the cap for passage over the eye. The cap 16 has a concavo-convex contour and is positioned with its convex side forwardly. The cap is maintained in place upon the eye 11 by means of a swivel 18 of any suitable design. The fish line, indicated at 19, is attached to the swivel 18.

When cast and retrieved the lure has a very peculiar and unexpected action. As it is drawn toward the fisherman it will immediately assume the position of Fig. 1 with the barb of the hook upward. The wings 12 will then open outwardly as indicated in Fig. 7, by the successive views, "A", "B" and "C". When the wings have reached their extreme outward position they will fold back as indicated by the successive views "C", "D", and "E", and continue this natural wing-like action as long as in motion. When the wings are at their extreme spread they deflect the water downwardly causing the lure to float upwardly. When closed they allow the lure to sink downwardly so that it has a vertically undulating path as well as a flapping action. Since the wings are all metal they strike each other and against the cap 16 causing a slight metallic clicking noise which appears to immediately attract the attention of the fish.

It is difficult to explain the natural action of the lure. It may be caused by the concavity 15 of the wings creating a turbulent area in the water between the wings which acts to force them outwardly until the resistance of their forward faces overcomes this action and causes them to again close together. It may be caused by the cup shaped cap 16 which undoubtedly creates a trailing, rarified area adjacent a portion of the forward faces of the wings which may act to draw them forwardly and separate them. The action may depend on some other cause not known at the present time and it is desired to be understood that the invention is not dependent upon the accuracy of the theories advanced for its operation.

The cap 16 serves an additional purpose which would be valuable in any type of lure having a relatively large loose hook. It serves to prevent the hook from swinging backwardly and entangling with the line, for the hook cannot swing rearwardly past its contact point with the cap.

While a specific form of the improvement has been described and illustrated herein, it is desired to be understood that the same may be varied, within the scope of the appended claims without departing from the spirit of the invention.

Having thus described the invention, what is claimed and desired secured by Letters Patent is:—

1. A fish lure comprising: a ring; a hook extending from said ring; wings loosely carried by said ring and extending rearwardly at each side of said hook; means for attaching a fish line to said ring; and a metallic cap adapted to fit over said ring and about the forward extremities of said wings.

2. A fish lure comprising: a ring; a hook extending from said ring; wings loosely carried by said ring and extending rearwardly at each side of said hook; means for attaching a fish line to said ring; a cap having an elongated opening through which said ring projects, said cap surrounding the forward extremities of said wings, and having a concavo-convex contour.

3. A fish lure comprising: an open ring; a hook extending from said ring; wings loosely carried by said ring and extending rearwardly at each side of said hook; means for attaching a fish line to said ring, said wings having comparatively straight lower edges and curvated upper edges terminating at a substantial point at their rearward extremities, said curvated upper edges being turned outwardly so as to form a concavity on the forward face of said wings; and a cup-shaped cap having an elongated opening through which said ring projects so that said cap will lie over the forward extremities of said wings.

In testimony whereof, I affix my signature.

HAROLD G. ALLEN.